3,223,471
PROCESS FOR DYEING TEXTILE MATERIALS
Robert Kuth and Hanswilli von Brachel, Cologne-Sulz, Otto Schneider, Cologne-Flittard, and Mathieu Quaedvlieg, Leverkusen, Germany, assignors to Farbenfabriken Bayer Aktiengesellschaft, Leverkusen, Germany, a corporation of Germany
No Drawing. Filed Mar. 12, 1962, Ser. No. 179,249
Claims priority, application Germany, Mar. 17, 1961, F 33,439; Feb. 27, 1962, F 36,130
4 Claims. (Cl. 8—88)

The present invention relates to a process wherein textile materials are dyed in such a manner that the dyestuffs are padded or printed in the form of solutions or suspensions and subsequently fixed by heating; reference may be made, for example, to the thermosol process described in "American Dyestuff Reporter," 1949, page 593. More particularly the present invention concerns a process wherein such a padding or printing of textile materials is carried out in the presence of reaction products obtained by the reaction of high molecular weight carboxylic acids or their functional derivatives, for instance their acid chlorides, with ammonia, amines and/or alkylolamines, optionally with subsequent alkoxylation.

High molecular weight carboxylic acids which may serve for the production of the reaction products are for instance aliphatic carboxylic acids containing 12–24 carbon atoms such as lauric acid, palmitic acid, stearic acid, ricinoleic acid, linoleic acid and, chiefly oleic acid, furthermore cycloaliphatic carboxylic acids such as naphthenic acids, aromatic carboxylic acids substituted by alkyl radicals, and hydroaromatic carboxylic acids such as abietic acid. Also such high molecular weight carboxylic acids come into consideration whose chain of carbon atoms is interrupted by hetero atoms or groups containing hetero atoms, for instance oxygen, sulfur, a —COO— group, a carbonamide or sulfonamide group, such as nonylphenoxy acetic acid or dodecyl aminopropionic acid.

As amines and alkylolamines there are mentioned for instance methyl amine, ethyl amine, butyl amine, N-dimethyl-ethylene diamine, monoethanol amine, diethanol amine, triethanol amine, N-methyl-ethanolamine, N-propylethanolamine, $\beta$- or $\gamma$-propanolamines and the products prepared by the action of 1–4 mols of ethylene oxide on 1 mol of ethylene diamine, or the alkyl ethers of such alkylol amines, furthermore glycocoll and sarcosine.

Suitable reaction products to be applied according to the present invention can be obtained for instance by heating the relevant components with each other at temperatures of about 130–210° C. according to the manner described in the U.S. Patent No. 2,089,212. The molecular ratio between carboxylic acids and ammonia, amines or alkylolamines may be 1:1, 1:<1 or 1:>1 and the alkoxylation can be effected by means of ethylene oxide and/or propylene oxide in the ratio of about 2–40 mols of alkylene oxide per 1 mol of reaction product, the degree of the alkoxylation being in general chosen according to the desired water solubility.

Also mixtures of the proposed reaction products can be applied in the process of the invention. A special method of carrying out this process consists in using in addition to the reaction products, polyethers which contain as chain members polyethylene glycol radicals repeatedly alternating with radicals having not less than five carbon atoms directly linked with one another. Suitable polyethers and their application in the context are described in greater detail in copending United States patent application Serial No. 179,245.

The textile materials to be dyed or printed with the aid of the process according to the invention may be based on a great variety of synthetic products such as, for example, polyamides as, e.g., polycaprolactam, polyadipic acid, hexamethylene diamide, poly-$\omega$-amino-undecanic acid, furthermore polyurethanes or polyesters as, e.g., those from terephethalic acid and ethylene glycol or 1,4-dimethylol-cyclohexane, and in particular polyacrylonitrile or the mixed polymerizates of acrylonitrile with other vinyl compounds as, e.g., acrylic esters, acrylamides, vinyl-pyridine, vinyl chloride or vinylidene chloride. The process according to the present invention also comprises the dyeing or printing of textile materials which are produced from cellulose esters, for example from cellulose-triacetate or -butyrate. The process according to the invention may also be applied to mixed fabrics of synthetic fibers or mixed fabrics of synthetic fibers and fibers of natural origin such as wool or cotton.

As with the known dyeing process mentioned above, dyestuffs of a most varied type may also be used in the present case, for example, disperse dyestuffs, vat dyestuffs, acid wool dyestuffs, metal complex dyestuffs or basic dyestuffs. Mixed fabrics can be dyed by appropriate choice of the dyestuff from one or more baths, possibly by inserting an exhaust process, and also selectively, if desired.

With the aid of the process according to the invention synthetic fiber materials can be dyed in a satisfactory manner also with dyestuffs with which they could hitherto be dyed only according to the exhaust process or not at all. For example, it is now possible to dye or print polyamide fibers with 2:1 chromium metal complex dyestuffs, or polyacrylonitrile fibers with dispersion dyestuffs.

In general, the reaction products to be used are added in dissolved or dispersed form in quantities of 0.1–10%, preferably in quantities of 0.2–5%, referred to the padding liquor or printing paste, but they may also be admixed to the dyestuffs in suitable concentrations. If they are not sufficiently soluble in water, non-ionic emulsifiers such as alkoxylation products of fatty acids, fatty alcohols or alkylaryl or polyaryl phenols as well as ionogenic emulsifiers such as alkyl or alkylaryl sulfonates can be used as dispersing agents.

The polyethers to be used according to the invention are generally employed in quantities of 0.2–10%, preferably 0.5–4%, referred to the padding solution or printing paste used. In general, they are added to the final padding solution or printing paste, but they are also be admixed to the dyestuffs.

The reaction products ensure a completely homogeneous dispersion of the dyestuffs before and after fixing; they prevent two-sidedness and runnings of the dyeing at the selvedges, they impart an advantageous handle to the fabric and they appreciably improve the dyestuff yield. Above all, they bring about unobjectionable dyeings even when several dyestuffs are used, and they allow maintenance of the fixing temperature about 10–20° C. lower or require a correspondingly shorter fixing period than is customary in the above mentioned thermosol process. Moreover the otherwise required use of thickening agents which often give rise to a blocking of the apparatus is now unnecessary.

Further auxiliaries may also be used in the process according to the invention, for example plasticizers for influencing the handle of the textile materials, hydrotropic substances for increasing the solubility of the dyestuffs in the aqueous liquor, carriers for improving the penetration of the dyestuffs into the fibers, or agents for reducing the electrostatic recharge.

The following examples serve to illustrate the invention without, however, limiting the scope thereof. The dyestuffs designated in the examples by (a) to (o) are explained in the list at the end of the description.

EXAMPLE 1

A fabric of polyacrylonitrile filaments is impregnated on the foulard with a liquor containing per liter 20 g. of the dyestuff (a), 14.5 g. of the alkoxylation product of 1 mol of oleyl alcohol with 40 mols of ethylene oxide, 13.5 g. of urea and 15.5 g. of oleic acid ethanol amide prepared by heating molar quantities of oleic acid or oleic acid methyl ester and ethanol amine for 4 hours at 180–200° C. in an open vessel with stirring and removing the water formed. The fabric is then squeezed to a weight increase of about 80% and dried at 100° C. in a suspension nozzle drier or drying oven; for fixing the dyeing, the fabric is subsequently treated for 60 seconds at 190° C. with hot air in the same apparatus or in a tentering frame, then rinsed and washed with hot water.

The yellow brilliant dyeing obtained on the fabric is distinguished by an excellent levelness and outstanding fastness properties.

When using a padding liquor containing per liter 20 g. of the dyestuff (b) or 20 g. of the dyestuff (c) (see column 6) instead of 20 g. of the dyestuff mentioned above, a blue and red dyeing, respectively, is obtained having similar properties.

EXAMPLE 2

A fabric of polycaprolactam fibers is dyed as described in Example 1 with a liquor containing per liter 50 g. of the chromium complex of the dyestuff (d) (see column 6), 14.5 g. of oleic acid ethanol amide, 14.5 g. of the alkoxylation product of 1 mol of oleic acid with 40 mols of ethylene oxide, and also 14 g. of urea. Optical analysis shows that 92.5% of the dyestuff are thus fixed. The levelness of the dyeing is outstanding and the barriness of the polyamide fiber is not marked.

Dyeings of similar properties are obtained by using, instead of the chromium complex of the dyestuff (d), the chromium complex of the dyestuffs (e), (f), (g) or (h), or the cobalt complex of the dyestuff (i).

EXAMPLE 3

A fabric of polycaprolactam fibers is dyed as described in Example 1 with a liquor containing per liter 50 g. of the dyestuff (k), 15 g. of oleic acid N-methyl ethanol amide, 15 g. of the alkoxylation product of 1 mol of oleyl alcohol with 40 mols of ethylene oxide, as well as 10 g. of urea. The resultant dyeing shows a brilliant level blue shade and a good dyestuff yield.

EXAMPLE 4

A knitted fabric of polycaprolactam or nylon fibers is dyed as described in Example 1 with a liquor containing per liter 0.2 g. of the chromium complex of the dyestuff (f), 0.5 g. of the dyestuff (k), 6 g. of oleic acid-β-propanol amide, 6 g. of the alkoxylation product of 1 mol of oleyl-alcohol with 40 mols of ethylene oxide, as well as 15 g. of urea.

The resultant blue dyeing is outstandingly level and compares with dyeings obtained with disperse dyestuffs according to the exhaust process. However, the fastness to wetting achieved in the present case is appreciably superior to that obtained with the use of disperse dyestuffs.

EXAMPLE 5

A fabric of polyethylene terephthalate fibers is dyed according to the instructions of Example 1 with a liquor containing per liter 8 g. of the dyestuff (l), 8 g. of the dyestuff (m), 4 g. of the dyestuff (n), 10 g. of oleic acid ethanol amide, 5 g. of stearic acid ethanol amide, 15 g. of the alkoxylation product of 1 mol of oleyl alcohol with 40 mols of ethylene oxide, as well as 15 g. of urea. The resultant dyeing possesses a red-brown shade and is very level.

EXAMPLE 6

A fabric of polyacrylonitrile filaments is treated according to the instruction of Example 1 with a liquor containing per liter 2.5 g. of the dyestuff (o), 20 g. of the polyether described below, 2.7 g. of oleic acid ethanol amide and 2.7 g. of the alkoxylation product of 1 mol of oleyl alcohol with 40 mols of ethylene oxide. Fixation is carried out at 180° C. for 60 seconds. The resultant red pastel shade is completely level and the fabric possesses a full handle.

The polyether used is prepared in the following way: Ethoxylated resorcinol of molecular weight 1100 is condensed with thiodiglycol in a molecular ratio of 1:1.8 in the presence of 1 percent by weight of phosphoric acid at a temperature of 180–185° C. initially under normal pressure, then under vacuum at 10–15° C. mm. Hg, until a hydroxyl number of 20–22 is attained.

When dyeing is carried out with the use of a liquor containing per liter, in addition, 8 g. of the condensation product from molecular quantities of octa-ethylene glycol and dimethylol urea as well as 2 g. of butyl-naphthalene-sulfonic acid, the polyether used is fixed on the fiber fast to washing and there is thus obtained at the same time an antistatic finish which is fast to washing. The shade of the dyeing is not changed thereby.

EXAMPLE 7

A fabric of polyethylene terephthalate fibers is treated as described in Example 1 with a liquor containing per liter 4 g. of the dyestuff (l), 4 g. of the dyestuff (m), 12 g. of the dyestuff (n), 20 g. of the polyether described below, 6 g. of oleic acid ethanol amide, 6 g. of the alkoxylation product of 1 mol of oleyl alcohol with 40 mols of ethylene oxide, as well as 40 g. of urea. Fixation is carried out at 185° C. for 70 seconds. The resultant grey-blue dyeing is distinguished by an outstanding dyestuff yield and good levelness.

The polyether used is prepared by oxidizing the polyether described in Example 6 subsequently with 1 mol of hydrogen peroxide per mol of thiodiglycol contained in the polyether.

EXAMPLE 8

A fabric of polyethylene-terephthalate fibers is treated according to the instructions of Example 1 with a liquor having the composition of the liquor of Example 7 and containing moreover per liter 8 g. of the condensation product from molecular amounts of octa-ethylene glycol and dimethylol urea as well as 2 g. of butyl-naphthalene-sulfonic acid. Fixation is carried out at 190° C. for 60 seconds. The resultant dyeing equals that of Example 7; moreover, the fabric possesses an antistatic finish which is fast to washing.

EXAMPLE 9

A fabric of polyacrylonitrile filaments is impregnated on the foulard with a liquor containing per liter 30 g. of the dyestuff (a) and 20 g. of the reaction product obtained by heating 1 mol of oleic acid with 2 mols of di-ethanol amine for 2 hours at 180–210° C. in an open vessel with stirring and removing the water formed. The fabric is then squeezed to a weight increase of about 80%, dried at 100° C. in a suspension nozzle drier, subsequently heated for 60 seconds at 180° C. for fixing the dyeing, then rinsed, washed at about 50° C. and optionally subjected to a reductive after-treatment.

The yellow brilliant dyeing obtained on the fabric is distinguished by excellent levelness and outstanding fastness properties.

When using a padding liquor containing per liter a mixture of 20 g. of the dyestuff (a), 5 g. of the dyestuff (b) and 5 g. of the dyestuff (c) instead of 30 g. of the dyestuff (a), a very level brown dyeing is obtained which does not show any disturbing dichroism.

EXAMPLE 10

A fabric of polycaprolactam fibers is dyed as described in Example 9 with a liquor containing per liter 40 g. of the chromium complex of the dyestuff (k), 10 g. of the alkoxylation product of 1 mol of abietic acid with 24 mols of ethylene oxide as well as 20 g. of the reaction product prepared by heating 1 mol of linoleic acid with a mixture of 1 mol of monoethanol amine and 1 mol of triethanol amine for 4 hours at 180–210° C. in an open vessel with stirring and removing the water formed.

The resultant blue dyeing is very level and shows excellent fastness properties.

EXAMPLE 11

A fabric of polyethylene terephthalate fibers is dyed as described in Example 9 with a liquor containing per liter 10 g. of the dyestuff (o), 10 g. of the reaction product of 1 mol of oleic acid with 2 mols of diethanol amine as well as 10 g. of the alkoxylation product obtained by contacting 20 mols of ethylene oxide with the reaction product of 1 mol of oleic acid and 1 mol of monoethanol amine.

The resultant red dyeing is distinguished by clearness and levelness.

EXAMPLE 12

A fabric of polyacrylonitrile fibers is dyed as described in Example 9 with a liquor containing per liter 40 g. of the dyestuff (a) and 20 g. of the alkoxylation product obtained by contacting 20 mols of ethylene oxide with the reaction product prepared by heating 1 mol of abietic acid with 1 mol of monoethanol amine for 6 hours at 180–200° in an open vessel with stirring and removing the water formed.

The yellow dyeing obtained on the fabric is distinguished by brilliancy, levelness and outstanding fastness properties.

When using a padding liquor containing per liter a mixture of 24 g. of the dyestuff (a), 8 g. of the dyestuff (b) and 8 g. of the dyestuff (c) instead of 40 g. of the dyestuff (a) a very level brown dyeing is obtained which does not show any disturbing dichroism.

EXAMPLE 13

A fabric of polyethylene terephthalate fibers is dyed as described in Example 9 with a liquor containing per liter 10 g. of the dyestuff (o) and 20 g. of the alkoxylation product obtained by contacting 14 mols of ethylene oxide with the reaction product prepared by heating 1 mol of oleic acid with 1 mol of monoethanol amine as described in Example 1.

The resultant red dyeing is very level and clear.

EXAMPLE 14

A fabric of polycaprolactam filaments is dyed as described in Example 9 with a liquor containing per liter 30 g. of the chromium complex of the dyestuff (k) and 20 g. of the alkoxylation product obtained by contacting 30 mols of ethylene oxide with the reaction product prepared by heating 1 mol of ricinoleic acid with a mixture of 1 mol of monoethanol amine and 1 mol of diethanol amine for 12 hours as described in Example 9.

The resultant level blue dyeing is distinguished by outstanding fastness properties.

List of the dyestuffs

Designation: Explanation
- (a) — Dyestuff according to Example 1 of German Patent No. 666,081.
- (b) — Quaternized dyestuff according to line 5 of the table of Example 6 of French Patent No. 1,158,839.
- (c) — Azodyestuff of Example 48 of German Patent No. 1,011,396.
- (d) — Azodyestuff of Example 1 of French Patent No. 1,131,819.
- (e) — Azodyestuff according to Color Index, second edition, No. 18,690.
- (f) — Azodyestuff of Example 3 of French Patent No. 1,058,651.
- (g) — Azodyestuff of Example 6 of German Patent No. 940,483.
- (h) — Azodyestuff of Example 1 of German Patent No. 953,452.
- (i) — Azodyestuff No. 3 of the table of Example 3 of German Patent No. 953,827.
- (k) — Dyestuff of the first paragraph of Example 2 of German Patent No. 933,353.
- (l) — Azodyestuff 3 - nitranilin→1 - methyl-4-hydroxy-quinolone-2.
- (m) — Azodyestuff 1-amino-2-cyano-4-nitrobenzene→N-bisacethydroxyethyl-aniline.
- (n) — Dyestuff of the first paragraph of Example 1 of German Patent No. 1,029,506.
- (o) — 1 - amino-2-phenoxy-4-hydroxy - anthraquinone.

We claim:

1. In a process for dyeing textile material of synthetic fibers wherein the textile material is treated with a member selected from the group consisting of a solution and a suspension of a dyestuff, and fixing the dyestuff on the treated textile material by heating, the improvement consisting of treating with the dyestuff in the presence of a combination of additives consisting of active amounts of (1) a reaction product of a high molecular weight carboxylic acid with a member selected from the group consisting of ammonia, an amine, and an alkylolamine, and (2) polyethers containing as chain members polyethylene glycol radicals repeatedly alternating with radicals having not less than 5 carbon atoms directly linked with one another.

2. The process of claim 1 wherein the reaction product is alkoxylated.

3. The process of claim 1 wherein the synthetic fiber is a member selected from the group consisting of polyamide, polyurethane, polyester, cellulose ester derivative, and mixtures thereof with natural fibers; and the reaction product is employed in the amount of about .1%–10% by weight of liquor.

4. The process of claim 1 wherein the polyether is employed in the amount of about .2%–10% by weight of liquor.

References Cited by the Examiner

UNITED STATES PATENTS

| | | | |
|---|---|---|---|
| 1,970,578 | 8/1934 | Schoeller et al. | 8—93 X |
| 2,089,212 | 8/1937 | Kritchevsky | 8—87 X |
| 2,133,480 | 10/1938 | Schoeller et al. | 8—88 X |
| 2,763,529 | 9/1956 | Albrecht et al. | 8—88 |
| 2,963,513 | 12/1960 | Albrecht | 8—88 X |

NORMAN G. TORCHIN, *Primary Examiner.*

MORRIS O. WOLK, *Examiner.*